United States Patent
Kooima et al.

[11] Patent Number: 6,098,761
[45] Date of Patent: Aug. 8, 2000

[54] LOCKING ASSEMBLY FOR WHEELED CARGO TRANSPORTATION CART

[75] Inventors: Jacob J. Kooima, Spirit Lake; Larry Kats, Rock Valley, both of Iowa

[73] Assignee: Dethmers Manufacturing Company, Inc., Iowa

[21] Appl. No.: 09/032,578

[22] Filed: Feb. 27, 1998

[51] Int. Cl.[7] .................................. B60T 1/00; B60T 1/14
[52] U.S. Cl. ............................. 188/23; 188/5; 280/47.34; 280/79.11
[58] Field of Search .................................... 188/5, 21, 23, 188/19; 280/47.34, 33.994, 763.1, 79.11, 79.2, 79.3, 79.4, 79.5, 79.6, 79.7

[56] References Cited

U.S. PATENT DOCUMENTS

| | | | |
|---|---|---|---|
| 2,796,150 | 6/1957 | Gambardella | 188/5 |
| 3,231,050 | 1/1966 | Belyeu | 188/5 |
| 4,073,369 | 2/1978 | Nordskog | 188/5 |
| 5,035,445 | 7/1991 | Poulin | 188/5 |
| 5,462,300 | 10/1995 | Chien | 188/5 |
| 5,472,219 | 12/1995 | Eckstrum | 188/5 |

FOREIGN PATENT DOCUMENTS

| 27715 | of 1909 | United Kingdom | 188/21 |
|---|---|---|---|

*Primary Examiner*—Robert J. Oberleitner
*Assistant Examiner*—Robert A. Siconolfi
*Attorney, Agent, or Firm*—Brian J. Laurenzo; Michael C. Gilchrist

[57] ABSTRACT

A locking assembly for a wheeled transportation cart, comprising an adjustment member in rotatable engagement with the frame of the wheeled cart. The adjustment member is selectively adjustable between a locked position thereby preventing rolling movement of the wheeled cart, and an unlocked position thereby allowing rolling movement of the wheeled cart. The adjustment member contains a first knee formed by a first bent section in the adjustment member which is engaged between a first locking element and a first locking channel, and a second knee formed by a second bent section in the adjustment member which is engaged between a second locking element and a second locking channel. As the adjustment member rotates between the locked and the unlocked positions, the adjustment member forces the first and second locking elements downward toward a support surface and engages a first and second locking assembly spring means to urge the first and second locking elements into contact with the support surface.

11 Claims, 13 Drawing Sheets

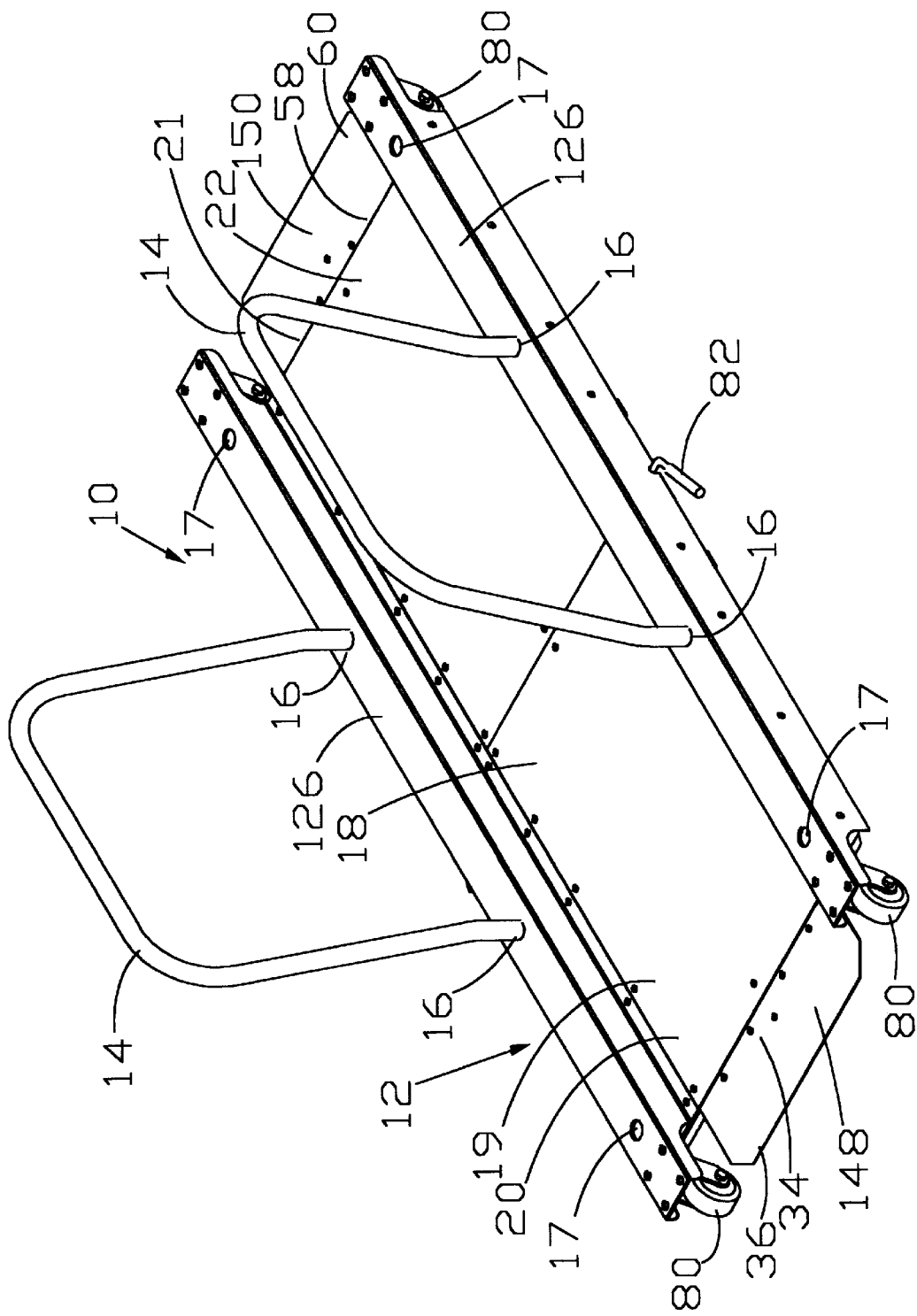

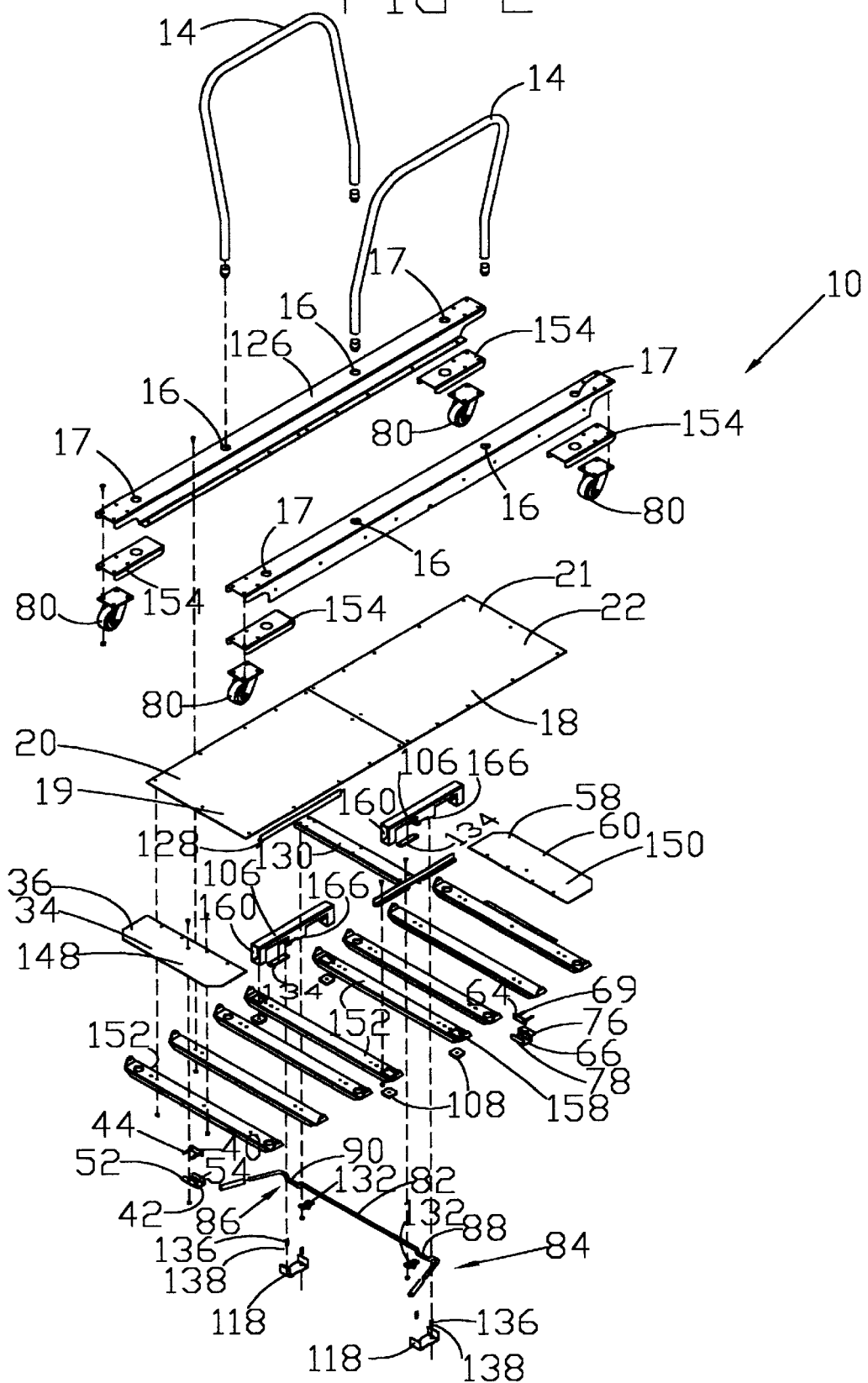

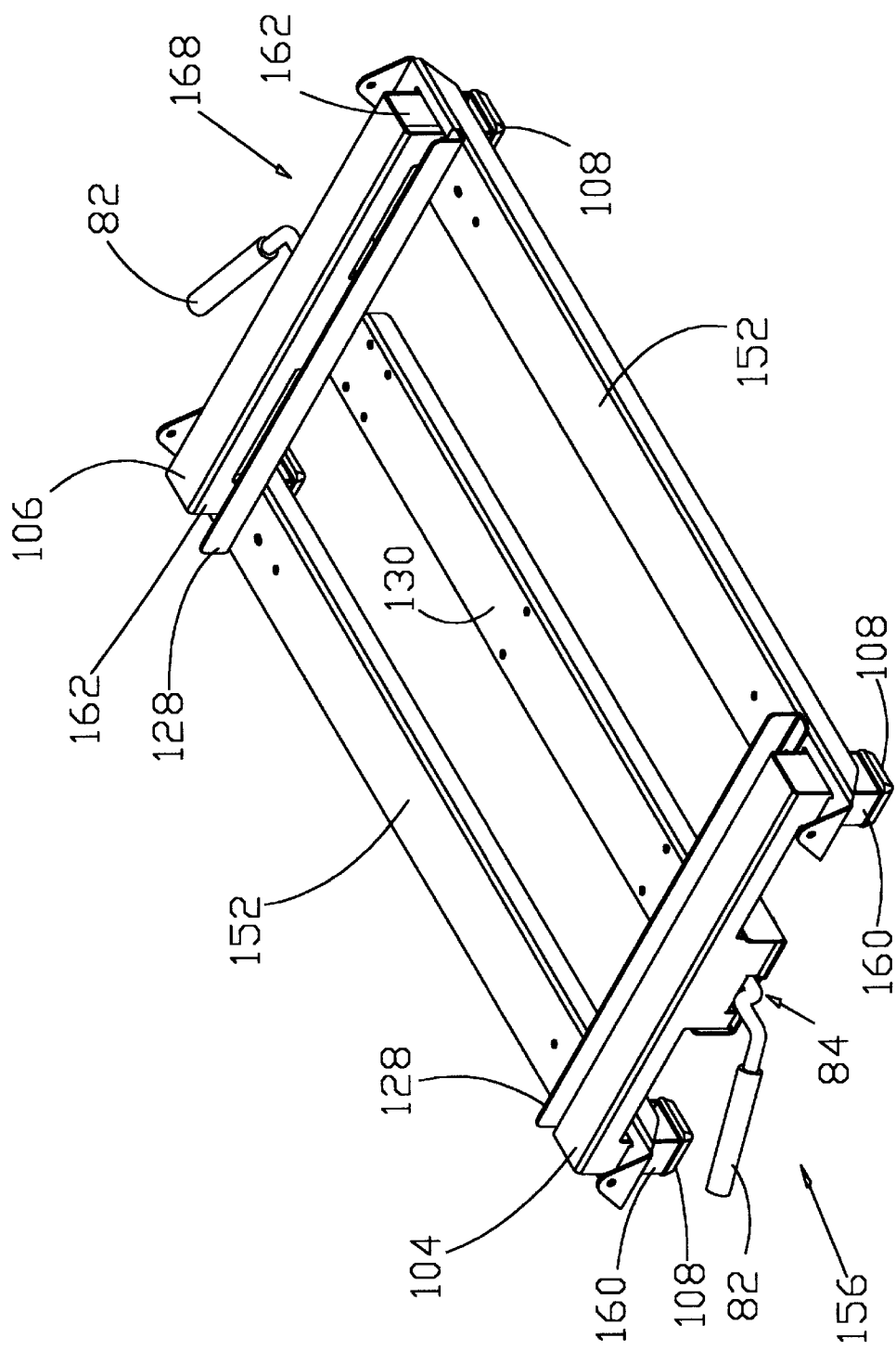

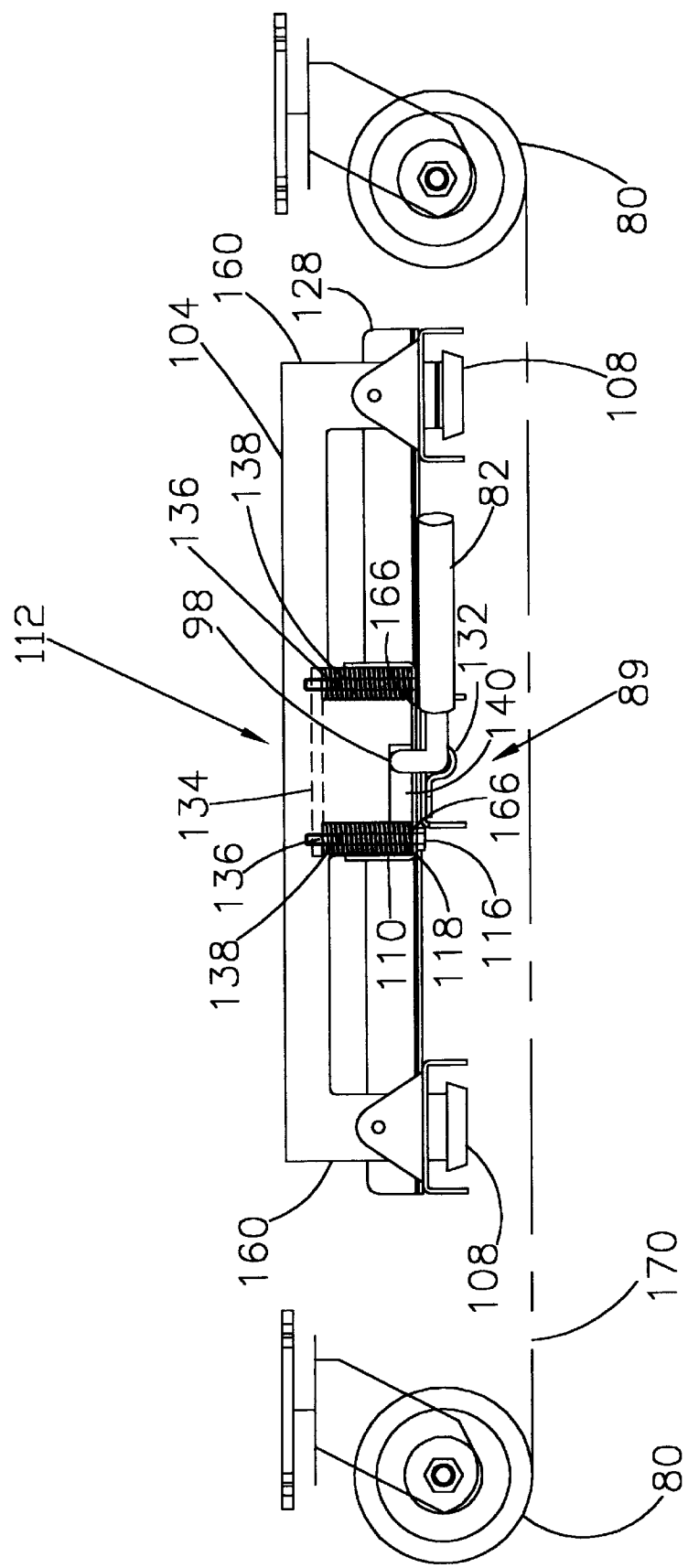

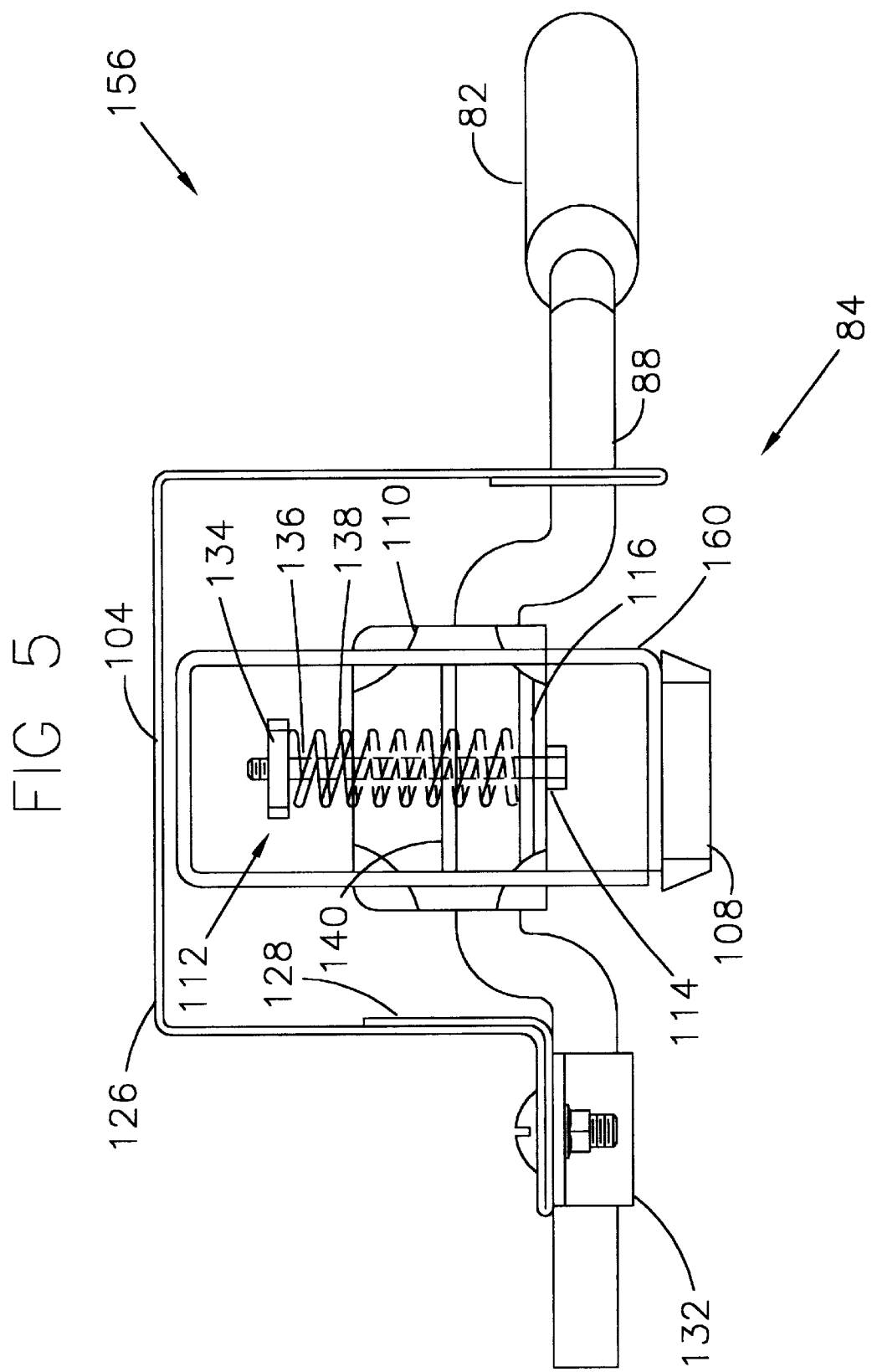

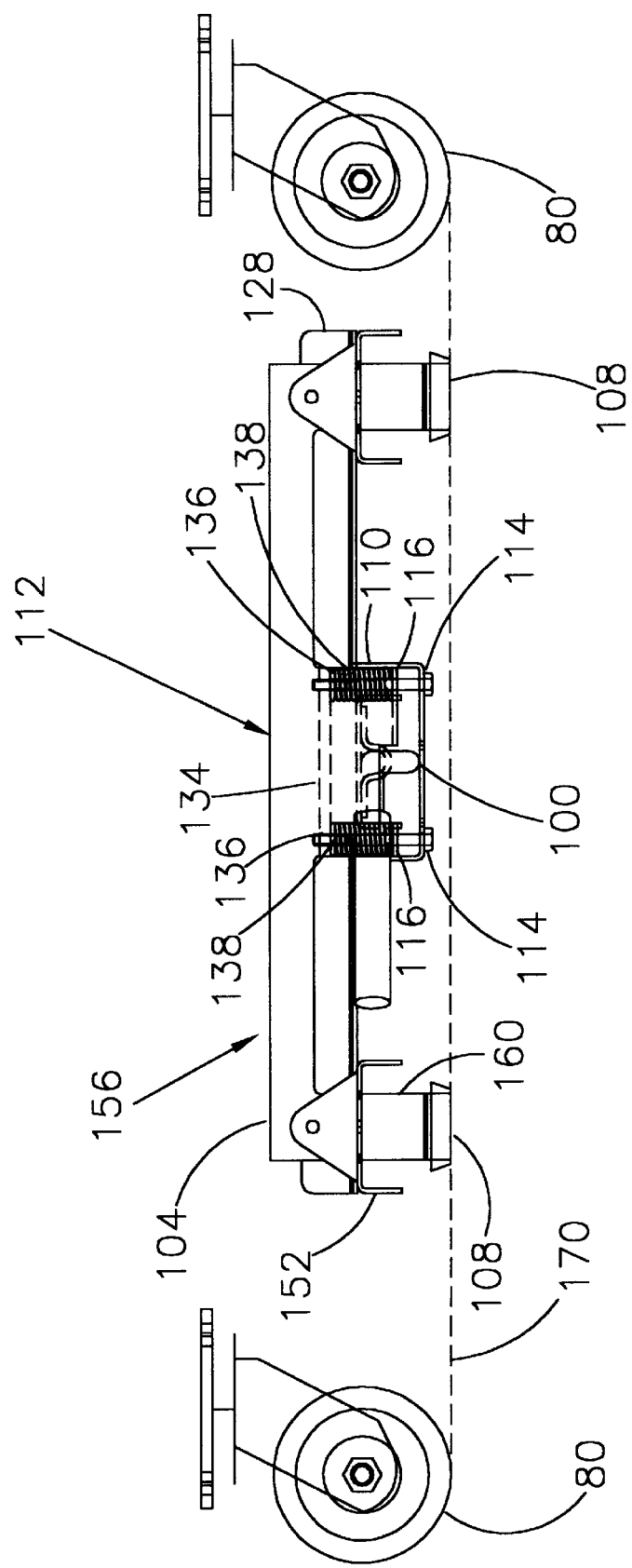

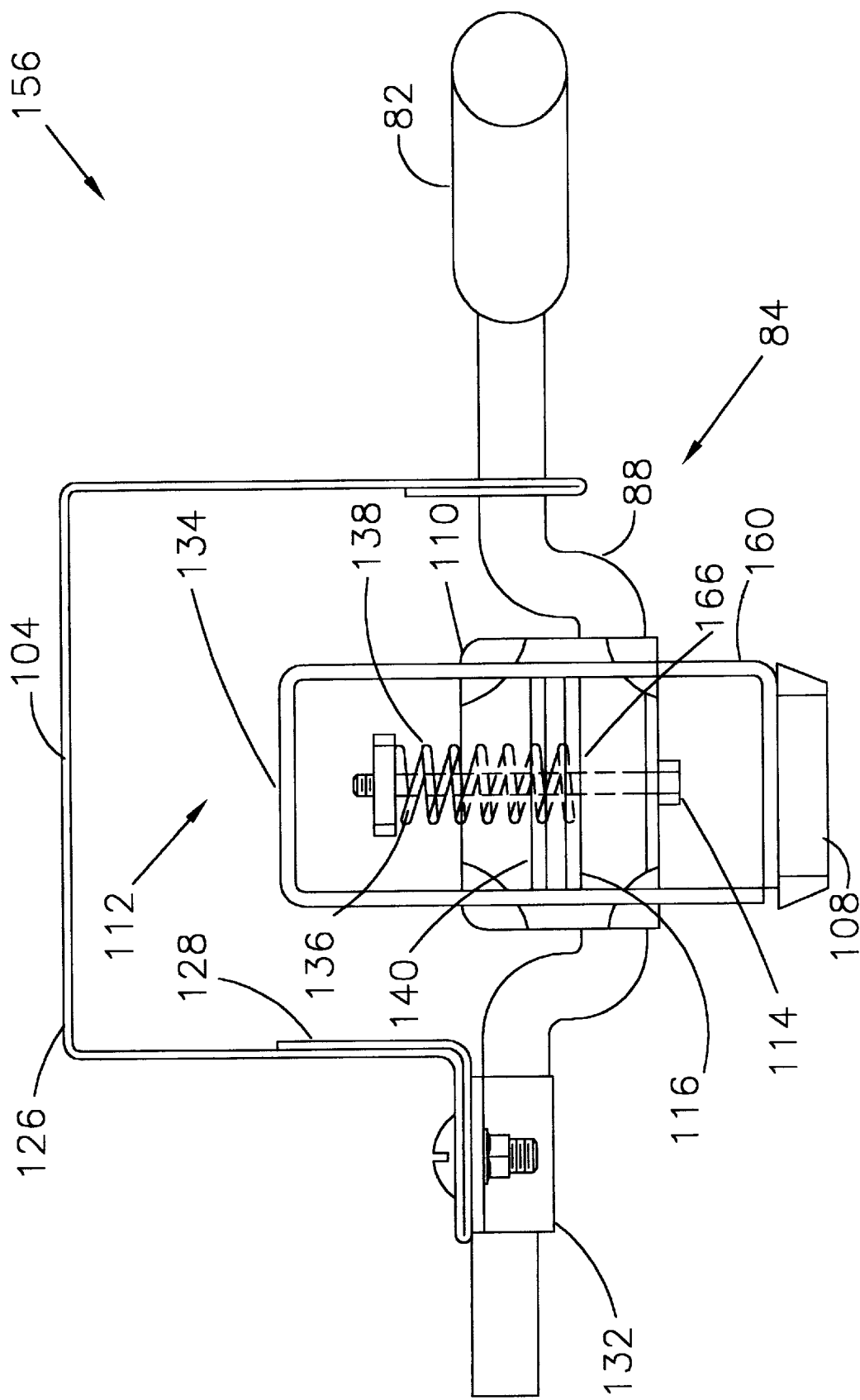

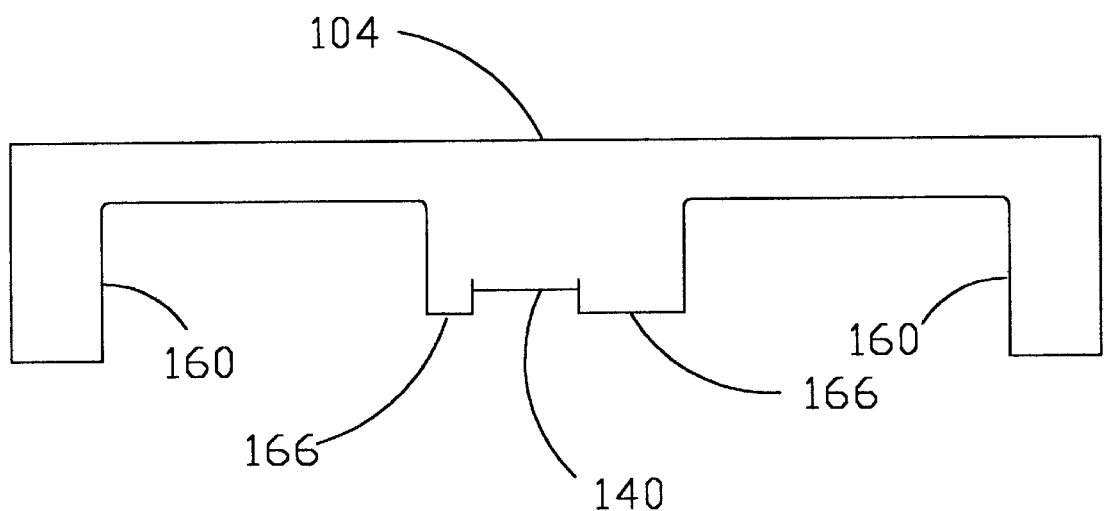
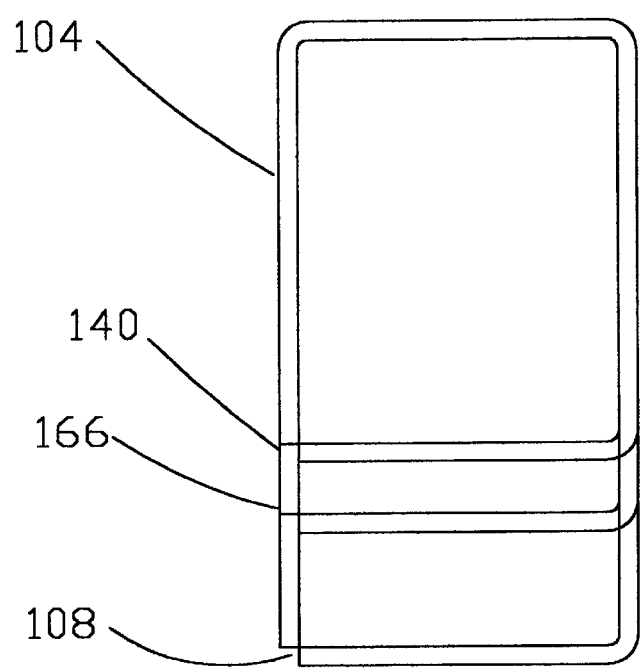

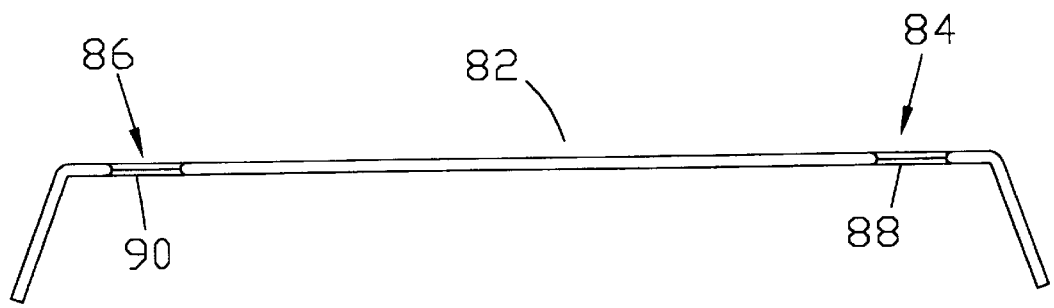
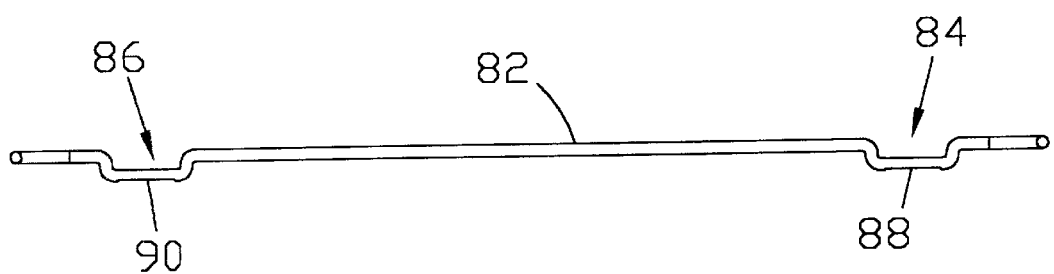
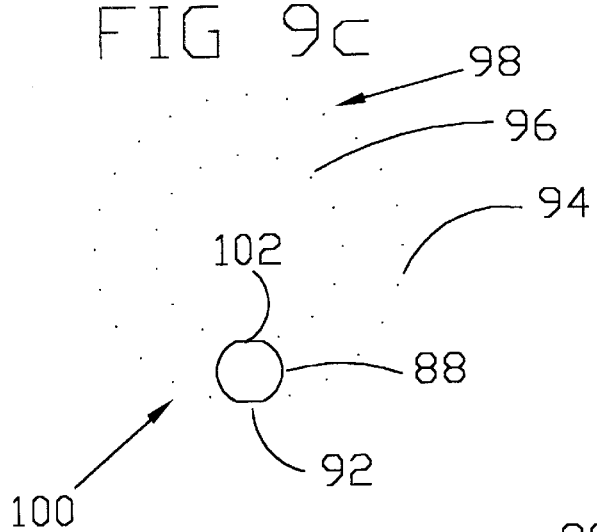
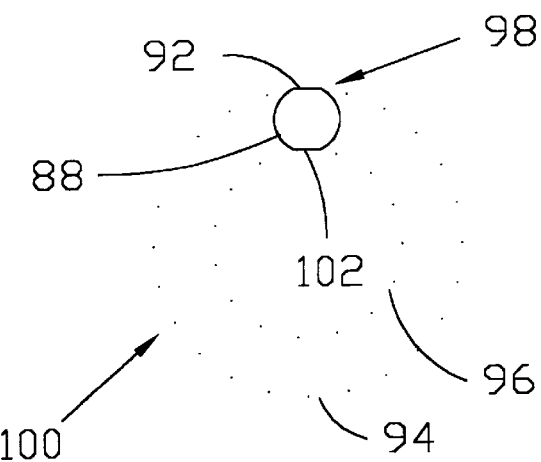

LOCKING ASSEMBLY FOR WHEELED CARGO TRANSPORTATION CART

BACKGROUND OF INVENTION

The invention relates to a locking assembly for a wheeled cargo transportation cart, and in particular to a braking assembly that uses an adjustment member to engage a locking element with a support surface to keep the wheeled cart stationary.

Wheeled carts are used extensively for moving motorcycles, all terrain vehicles, lawn mowers, snowmobiles, and the like. Typically, the wheels of the cart swivel to allow for universal movement of the cart on a smooth surface. The cart thereby facilitates the maneuverability of its cargo. The carts are used to transport their cargo between two remote locations where it would normally be cumbersome or difficult to move the cargo without the aid of a cart. Sometimes the cargo is stored on the cart itself. One common use for the carts is to maneuver motorcycles through crowded garages or storage areas. The swiveling wheels of the cart may allow the motorcycle to be moved into cramped locations for storage. For example, to move a motor cycle into position parallel to a wall, with items in front and behind the desired location for the motorcycle, the motorcycle may have to be lifted off the ground, or at least, an iterative process of backing and moving forward, slowly angling the motorcycle into place would be required. Wheeled carts allow the motorcycle to be moved transverse to its normal direction of travel, so that the motorcycle can slide easily into an otherwise crowded storage position parallel to a wall.

The preferred method of loading a motorcycle, or other wheeled items, onto a wheeled cart is to roll the motorcycle up a ramp and onto a cargo surface of the wheeled cart. In the case of free standing ramps, the ramps require positioning adjacent to the wheeled cart every time the cargo is loaded or unloaded. Every time the wheeled cart moves to a new location the freestanding ramp also requires relocation. Freestanding ramps are easily lost or misplaced, as well as being temporarily inaccessible. An attached ramp has the advantage of always being accessible to the wheeled cart, but requires some means to disengaged and engage the ramp to allow for rolling movement of the cart.

A further complication comprises movement of the wheeled cart during loading and unloading. For this reason, it is advantageous to provide some means for preventing rolling movement of the cart during loading and unloading. Furthermore, it is desirable to prevent the cart from accidentally rolling out of place during storage. Most carts are provided with some device for preventing the cart from rolling during loading and storage. One method of preventing unwanted roll, is to make the wheels themselves lockable. This method has the difficulties of requiring each wheel to be locked individually and of being difficult to ascertain from a visual inspection whether all the wheels are in the locked position or the free rolling position.

An improvement on the prior art locking wheels are spring loaded plungers that can be adjusted to remove the weight of the cart from the wheels and place the weight onto the plungers. As with the locking wheels, spring loaded plungers have the disadvantage of requiring individual activation. Also, as the plungers are activated one-by-one, the cart can tilt or twist out of its desired position and orientation. Therefore, a need exists for a braking assembly that can be implemented with a single adjustment and that does not induce twisting or tilting of the cart.

The difficulties encountered in the prior art and discussed above are substantially eliminated by the present invention.

SUMMARY OF THE INVENTION

An object of the present invention comprises providing a wheeled cart that allows for transportation in any direction.

Another object of the present invention comprise providing a wheeled cart with an attached ramp for unloading and loading of cargo.

A further object of the present invention comprises providing a wheeled cart with an attached ramp for unloading and loading of cargo that automatically pivots between an engagement and a disengagement position.

An additional object of the present invention comprises providing a wheeled cart with a locking assembly that prevents the wheeled cart from moving when loading, unloading, and storing cargo.

A still further object of the present invention comprises providing a wheeled cart with a locking assembly that easily allows for identification of the status of the locking assembly.

One more object of the present invention comprises providing a wheeled cart with a locking assembly that engages and disengages without tipping or tilting the wheeled cart.

Another object of the present invention comprises providing a wheeled cart with a locking assembly that engages and disengages the entire wheeled cart with one adjustment.

Accordingly, it is an object of the present invention to provide a wheeled cart that can easily be adjusted into a locked position to prevent rolling of the cart during loading and unloading of cargo and during storage. The wheeled cart has a frame and a cargo surface supported above the frame. The wheeled cart also comprises an attached cargo ramp assembly which automatically pivots between an engagement position for loading and unloading of cargo, and a disengagement position for storage of cargo by engaging the cargo with the cargo ramp assembly. Additionally, the frame is provided with a plurality of wheels to allow for rolling movement of the cart on a generally even support surface. An adjustment member is in rotational engagement with the frame, and is selectively rotatable between a braking position and a rolling position. A locking element is engaged with the adjustment member such that as the adjustment member is adjusted to the braking position, a substantial portion of the weight of the cart including any cargo, is transferred from the wheels to the locking element, thereby resisting rolling of the cart.

These and other objects will become apparent upon reference to the following specification, drawings, and claims.

BRIEF DESCRIPTION OF THE DRAWINGS

FIG. 1 shows a perspective view of a wheeled cart.

FIG. 2 shows an exploded perspective view of the wheeled cart of FIG. 1

FIG. 3 shows a perspective view of the locking assembly and the center portion of the frame of the wheeled cart of FIG. 1.

FIG. 4. shows a side elevation view of the locking assembly of the wheeled cart of FIG. 1 in the unlocked position.

FIG. 5 shows an end elevation view of the locking assembly of the wheeled cart of FIG. 1 in the unlocked position.

FIG. 6. shows a side elevation view of the locking assembly of the wheeled cart of FIG. 1 in the locked position.

FIG. 7 shows an end elevation view of the locking assembly of the wheeled cart of FIG. 1 in the locked position.

FIG. 8a shows a side elevation view of the locking element of the locking assembly of the wheeled cart of FIG. 1

FIG. 8b shows an end elevation view of the locking element of the locking assembly of the wheeled cart of FIG. 1.

FIG. 9a shows a top plan view of the adjustment member of the locking assembly of the wheeled cart of FIG. 1.

FIG. 9b shows a side elevation view of the adjustment member of the locking assembly of the wheeled cart of FIG. 1.

FIG. 9c shows a cross sectional view of the knee of the adjustment member of the locking assembly of the wheeled cart of FIG. 1 in the locked position.

FIG. 9d shows a cross sectional view of the knee of the adjustment member of the locking assembly of the wheeled cart of FIG. 1 in the unlocked position.

DETAILED DESCRIPTION OF PREFERRED EMBODIMENTS

Figure 10A:
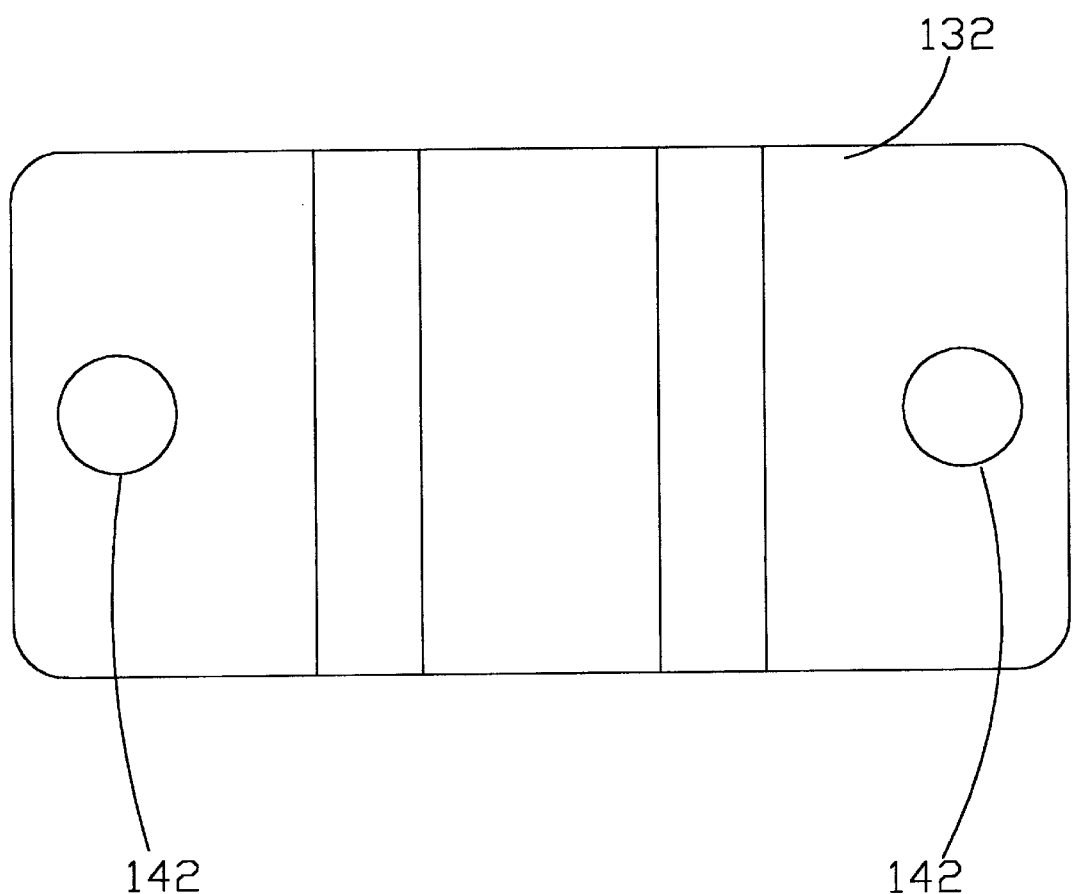
FIG. 10a shows a bottom plan view of the u-clamp of the wheeled cart of FIG. 1.

Referring to the drawings FIG. 1 shows a preferred embodiment of a wheeled cart 10 for transportation and storage of cargo. The wheeled cart 10 contains a frame 12. Referring to FIG. 2 and FIG. 3, the frame 12 has two side rails 126 located along a longitudinal axis of the wheeled cart 10. The frame 12 also has a series of cross braces 152. The cross braces 152 attach to the side rails 126 such that they align along a transverse axis of the wheeled cart 10. Additionally, the frame 12 includes four side rail inserts 154. The side rail inserts 154 secure to the distal ends of the side rails 126. Further, the frame 12 also contains a center brace 130, which like the cross braces 152 aligns along the transverse axis of the frame 12. Side rail braces 128 secure to either end of the center braces 130.

The side rails 126 also contain handle guides 16,17 for removable engagement with handles 14. The location of the handle guides 16,17 allows for engagement of the handles 14 along the transverse axis of the wheeled cart 10 and along the longitudinal axis of the wheeled cart 10. In other words, the two centrally located handle guides 16 of each side rail 126 allow for engagement of the handles 14 along the longitudinal axis of the wheeled cart 10. Additionally, the distally located handle guides 17 of the side rails 126 allow for positioning of the handles 14 along the transverse axis of the wheeled cart 10. In this manner, the wheeled cart is capable of push movement along the transverse axis or the longitudinal axis of the wheeled cart 10.

Figure 13:
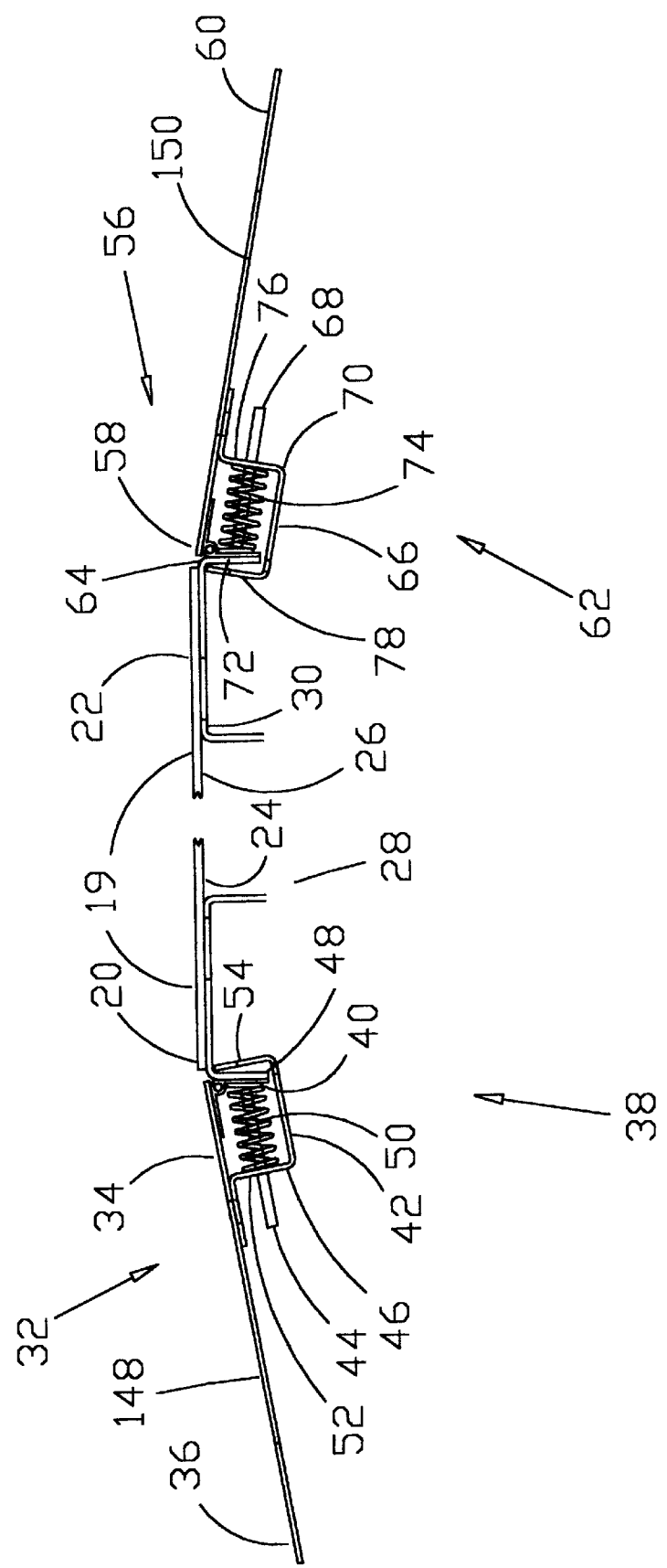
FIG. 13 shows a side elevation view of the ramp assembly of the wheeled cart of FIG. 1.

The wheeled cart 10 also contains a cargo surface 18 for receipt and storage of cargo. The cargo surface 18 secures to the frame 12 by mounting on top of the cross braces 152 and the center brace 130. FIG. 13 shows that the cargo surface 18 is comprised of an upper side 20 of a first end 19 of the cargo surface 18 which is located above a lower side 24 of the first end 19 of the cargo surface 18. In a corresponding manner, an upper side 22 of a second end 21 of the cargo surface 18 is located above a lower side 26 of the second end 21 of the cargo surface 18. A first cargo surface channel 28 engages with the lower side 24 of the first end 17 of the cargo surface 18. A second cargo surface channel 30 engages with the lower side 26 of the second end 21 of the cargo surface 18.

The wheeled cart 10 also contains a first cargo ramp assembly 32. The first cargo ramp assembly 32 contains a first ramp member 148. The first ramp member 148 contains a first end 34 located adjacent to the first cargo surface channel 28, and a second end 36 for contact with, and located adjacent to, the support surface 170. Therefore, the first ramp member 148 provides a transitional loading area between the support surface 170 and the cargo surface 18. The first cargo ramp assembly 32 pivots between a loading position whereby the second end 36 of the first ramp assembly 32 engages with the support surface 170, and a storage position where the first cargo ramp assembly 32 is disengaged with the support surface 170 and is aligned to a position substantially planer with the cargo surface 18. The movement of the first cargo ramp assembly 32 between the storage position and the loading position is accomplished by a first spring loaded pivot means 38.

The first spring loaded pivot means 38 is comprised of a first spring channel 42. The first spring channel 42 is engaged with the first end 34 of the first ramp member 148 of the first cargo ramp assembly 32. The first spring channel 42 is generally unshaped and contains two vertical portions that extend vertically downwards from the first ramp member 148. Thus, the first spring channel 42 contains a first end 52 and a second end 54.

The first spring loaded pivot means 38 also contains a first spring plate 40. The first spring plate 40 is engaged with the first end 34 of the first ramp member 148 of the first cargo ramp assembly 32. The first spring plate 40 extends vertically downward from the first end 34 of the first ramp member 148, and the first spring plate 40 contains two first spring plate passageways 48. The first spring loaded pivot means 38 also contains two first spring pins 44. The two first spring pins 44 pass through two first spring channel passageways 46 in the first spring channel 42 and engage with the first spring plate 40 at passageway 48. Additionally, the first spring loaded pivot means 38 contains two first springs 50.

The wheeled cart 10 also contains a second cargo ramp assembly 56. The second cargo ramp assembly 56 contains a second ramp member 150. The second ramp member 150 contains a first end 58 located adjacent to the second cargo surface channel 30, and a second end 60 for contact with, and located adjacent to, the support surface 170. Therefore, the second ramp member 150 provides a transitional loading area between the support surface 170 and the cargo surface 18. The second cargo ramp assembly 56 pivots between a loading position whereby the second and 60 of the second cargo ramp assembly 56 engages with the support surface 170, and a storage position where the second cargo ramp assembly 56 is disengaged with the support surface 120 and is aligned to a position substantially planer with the cargo surface 18. The movement of the second cargo ramp assembly 56 between the storage position and the loading position is accomplished by a second spring loaded pivot means 62.

The second spring loaded pivot means 62 is comprised of a second spring channel 66. The second spring channel is engaged with the first end 58 of the second ramp member 150 of the second cargo ramp assembly 56. The second spring channel 66 is generally u-shaped and contains two vertical portions that extend vertically downwards from the second ramp member 150. Thus, the second spring channel 66 contains a first end 76 and a second end 78.

The second spring loaded pivot means 62 also contains a second spring plate 64. The second spring plate 64 is engaged with the first end 58 of the second ramp member 150 of the first cargo ramp assembly 56. The second spring plate 64 extends vertically downward from the first end 58 of the second ramp member 150, and the second spring plate 64 contains two second spring plate passageways 72. The second spring loaded pivot means 62 also contains two second spring pins 68. The two second spring pins 68 pass through two second spring channel passageways 70 in the second spring channel 66 and engage with the second spring plate 64 at passageways 72. Additionally, the second spring loaded pivot means 62 contains two second springs 74.

The wheeled cart 10 also contains a plurality of wheels 80. The wheels 80 mount to side rail inserts 154 and then attach to the side rails 126 of the frame 12.

Figure 10B:
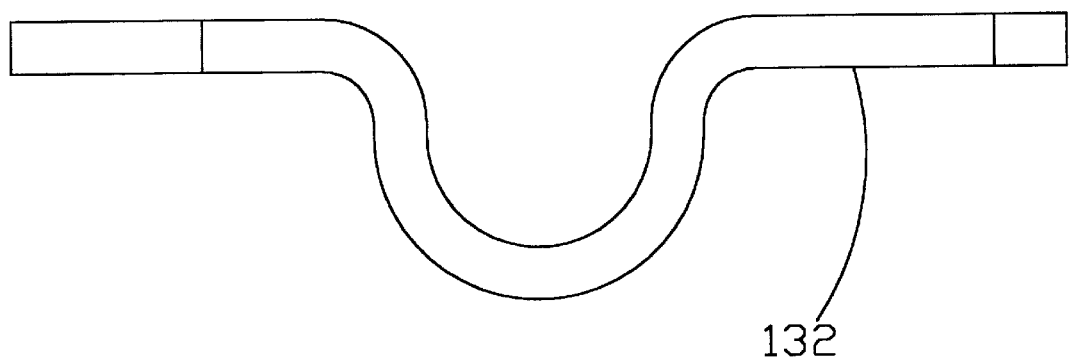
FIG. 10b shows a side elevation view of the u-clamp of the wheeled cart of FIG. 1.

The wheeled cart 10 also includes a first locking assembly 156, and a second locking assembly 164, shown generally in FIG. 3. The locking assemblies 156, 164 share a common adjustment member 82 held in rotatable engagement with the frame 12 by u-clamps 132 (FIGS. 10a–b). The u-clamps 132 actually engage with the center brace 130 of the frame 12, with bolts secured through passageways 142 (FIG. 2). The adjustment member 82 also contains a first end 84 and a second end 86 (FIGS. 9a–b). A first knee 88 of the adjustment member 82 is formed by a bent section in the first end 84 of the adjustment member 82. Likewise, a second knee 90 of the adjustment member 82 is formed by a bent section in the second end 86 of the adjustment member 82. FIG. 9c shows a cross sectional view of the first knee 88 of the adjustment member 82. The first knee 88 of the adjustment member contains a flattened outer engagement surface 92 and a flattened inner engagement surface 102. In a similar fashion a second knee 90 of the adjustment member 82 also contains a flattened outer engagement surface 92 and a flattened inner engagement surface 102.

Further, the first locking assembly 156 contains a first locking element 104 (FIGS. 8a–b).

The first locking assembly 156 engages with the frame 12 by inserting first locking element legs 160 of the first locking element 104 through cross brace passageways 158 in the cross braces 152.

Figure 11A:
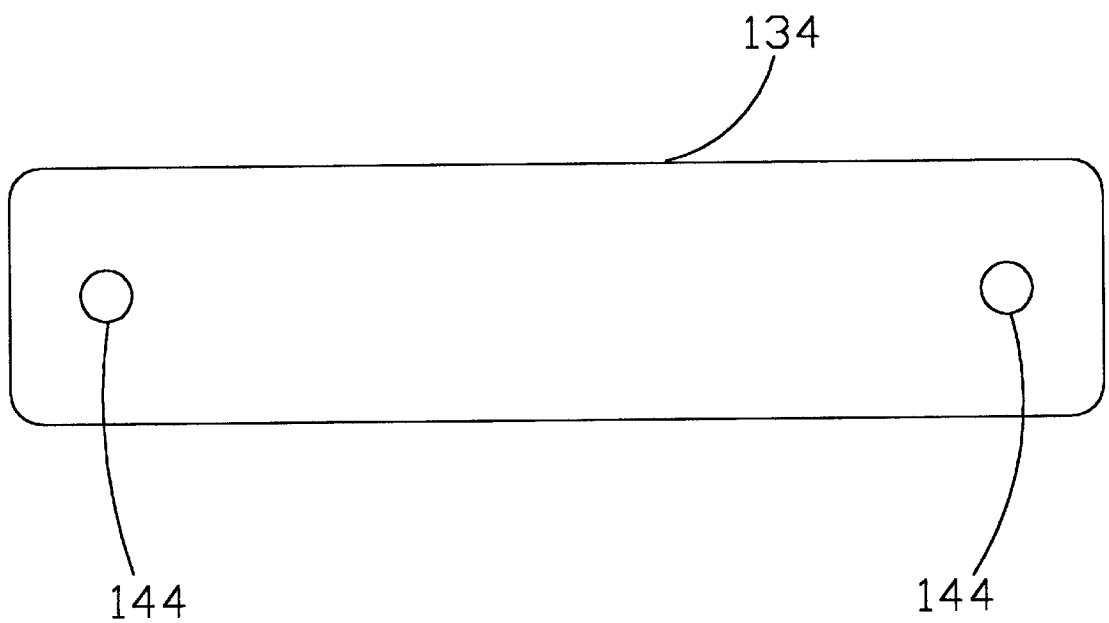
FIG. 11a shows a top plan view of the spring back plate of the spring loaded pivot means of the locking assembly of the wheeled cart of FIG. 1.
Figure 11B:
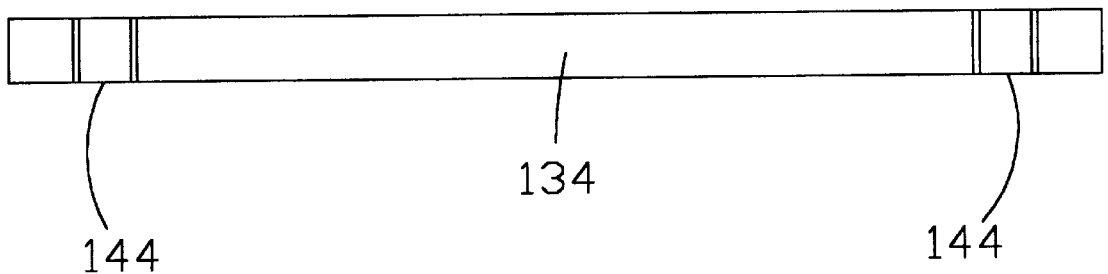
FIG. 11b shows a side elevation view of the spring back plate of the spring loaded pivot means of the locking assembly of the wheeled cart of FIG. 1.
Figure 12A:
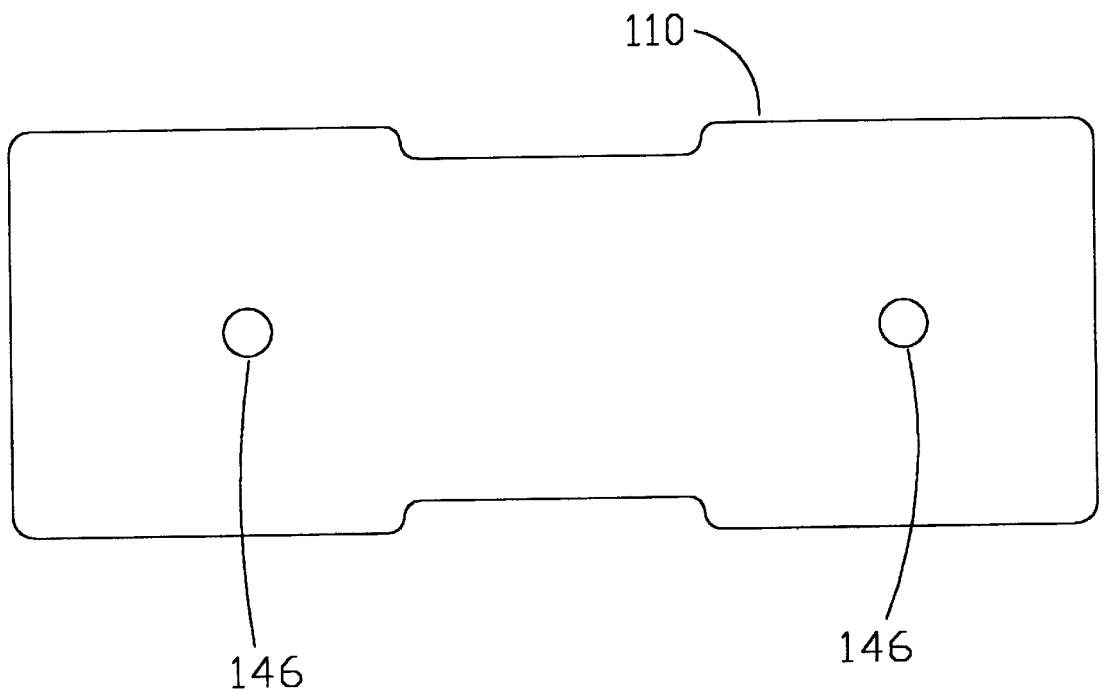
FIG. 12a shows a bottom plan view of the locking channel of the locking assembly of the wheeled cart of FIG. 1.
Figure 12B:
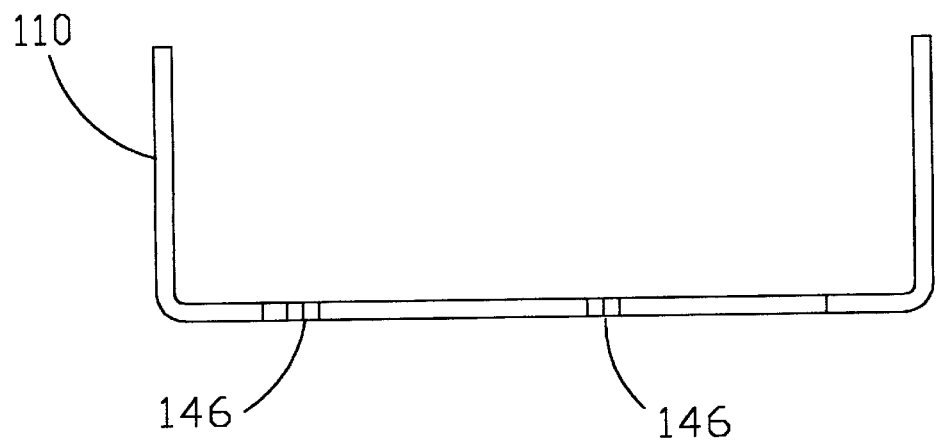
FIG. 12b shows a side elevation view of the locking channel of the locking assembly of the wheeled cart of FIG. 1.

The first locking assembly 156 also contains a first locking channel 110 which is in slideable engagement with the first locking element 104 (FIGS. 4–7, and FIGS. 12a–b). Additionally, the first locking assembly 156 contains a first locking assembly spring means 112. The first locking assembly spring means 112 contains a spring back plate 134, locking assembly pins 136, and locking assembly springs 138. The spring back plate contains passageways 144 (FIGS. 11a–b), through which bolts secure the locking assembly pins 136 to the spring back plate 134. A first section of the first locking assembly spring means 114 engages with the first locking channel 110, by the locking assembly pins 136 passing through the locking channel passageways 146 located in the first locking channel 110. Bolts secure the locking assembly pins 136 to the first locking channel 110. The first locking assembly spring means 112 also contains a second section 116. The second section 116 of the first locking assembly spring means 112 consists of two offset lips 166 in the first locking element 104. The offset lips 166 contain passageways through which the locking assembly pins 136 pass through, but which the locking assembly springs 138 do not pass through. In this manner, the first locking assembly spring means 112 contains a second section 116 which engages with the first locking element 104. The adjustment member 82 is positioned such that the first knee 88 passes between a center lip 140 of the first locking element 104, and between the first locking channel 110 (FIG. 5, FIG. 7).

FIG. 3 shows the second locking assembly 164. The second locking assembly 164 contains a second locking element 106. The second locking assembly 164 engages with the frame 12 by inserting the second locking element legs 162 of the second locking element 106 through cross brace passageways 158 in the cross braces 152. Further, the second locking assembly 164 also contains a second locking channel 118 which is in slideable engagement with the second locking element 106. Additionally, the second locking assembly 164 contains a second locking assembly spring means 120. It is understood that the aforementioned description of the first locking assembly 156 and the first locking assembly spring means 112 also describes the second locking assembly 164 and the second locking assembly spring means 120.

The following describes the functional operation of the wheeled cart 10. The first cargo ramp assembly 32 and the second cargo ramp assembly 56 of the wheeled cart 10 self adjust to allow loading and unloading of cargo. The placement of a load on the second end 36 of the first ramp member 148, or on the second end 60 of the second ramp member 150, pivots the first or second cargo ramp assembly 32, 56 between a storage position and an engagement position. The pivoting is accomplished by the spring loaded pivot means 38, 62. The following description relates to the first spring loaded pivot means 38, but it is understood that the second spring loaded pivot means 62 functions in the identical manner. The first spring plate 40 extends vertically downward from the first end 34 of the first ramp member 148 such that the first spring plate 40 is captured between the first end 52 of the first spring channel 42 and the second end 54 of the first spring channel 42. Therefore, when the load begins to exert a downward force on the second end 36 of the first ramp member 148 the first spring plate 40 moves away from the second end 54 of the first spring channel 42. Since the first springs 50 are captured between the first spring plate 40 and the first end 52 of the first spring channel 42, the downward pressure exerted by the cargo compresses the first springs 50. The cargo continues to exert a downward force on the first ramp member 148 until the second end 36 of the first ramp member 148 contacts the support surface 170. At this point the first springs 50 are fully compressed and the first cargo ramp assembly 32 is in the engaged position. This position allows for transportation of the cargo from the support surface 170 to the cargo surface 18. After the trailing end of the cargo moves from the first end 34 of the first ramp member 148 on to the cargo surface 18 the first springs 50 begins to urge the first spring plate 40 towards the second end 54 of the first spring channel 42. In this manner, the first ramp member 148 begins to pivot between the engaged position and the disengaged position. When the cargo transitions completely to the cargo surface 18, thereby removing all of the load from the first ramp member 148, the first springs 50 return the first ramp member 148 fully to the disengaged position.

When unloading cargo from the cargo surface 18 to the support surface 170, the first cargo ramp assembly functions in a similar manner. When the cargo begins to transition onto the first end 34 of the first ramp member 148, the first ramp member 148 moves downward toward the support surface 170. This movement forces the first spring plate 40 to compress the first springs 50. Eventually, as the cargo fully transitions onto the first ramp member 148 the second end 36 at the first ramp member 148 contacts the support surface 170. In this manner, the first cargo ramp assembly 32 pivots from the disengaged position to the loading position to allow for unloading of cargo. After the cargo transitions from the first ramp assembly 32 onto the support surface 170 the first springs 50 return the first cargo ramp assembly 32 to the disengaged position.

Coincident with the loading, unloading, and storage of cargo is the operation of the first locking assembly 156 and the second locking assembly 164. The following description describes the operation of the first locking assembly 156, but it is understood that the second locking assembly 164 functions in an identical manner. FIG. 4 and FIG. 5 show the first locking assembly 156 in the unlocked position, in this position the wheels 80 contact the support surface 170 and the friction surfaces 108 are suspended above the support surface 170. This configuration allows the wheeled cart 10 to move freely on the support surface 170. In this position, the flattened outer engagement surface 92 of the first knee 88 of the adjustment member 82 is in contact with the center lip 140 of the first locking element 104. The first knee 88 of the adjustment member 82 forces the center lip 140, and therefore the entire first locking element 104, upward above the level of the center brace 130 (FIG. 4). In this position, the locking assembly springs 138 of the first locking assembly spring means 112 are fully relaxed and exerts no pressure on the first locking element 104 or on the first locking channel 110. FIG. 9d shows the configuration of the first knee 88 of the adjustment member 82 in the unlocked position. FIG. 4 and FIG. 5 also show that the flattened inner engagement surface 102 contacts the first locking channel 110. FIGS. 9c–d depict the motion of the first knee 88 of the adjustment member 82 between the locked position and the unlocked position. The figures demonstrate that the first knee 88 of the adjustment member 82 moves through a generally circular arc of rotation when moving between the locked position and the unlocked position. Further, the figures show that the flattened outer engagement surface 92 remains substantially tangent to the outer perimeter of the arc of rotation 94 at all times, and that the flattened inner engagement surface 102 remains substantially tangent to the interior of the arc of rotation 96 at all times. Therefore, in the unlocked position, shown in FIG. 9d, the flattened outer engagement surface 92 is at the top of the arc of rotation 98. Additionally, FIG. 9c, which shows the first knee 88 of the adjustment member 82 in the locked position, shows that the flattened outer engagement surface 92 is at the bottom of the arc of rotation 100.

The following describes the sequence of events that take place when the first locking assembly 156 is moved from the unlocked position to the locked position. Initially, rotation of the adjustment member 82 begins movement of the first knee 88 of the adjustment member 82 from the top of the arc of rotation 98 depicted in FIG. 9d to the bottom of the arc of rotation 100 depicted in FIG. 9c. The first knee 88 of the adjustment member 82 follows a counter clockwise movement through the arc of rotation. The first knee 88 of the adjustment member 82 begins to move through the arc of rotation while remaining in contact with both the center lip 140 of the first locking element 104 and the first locking channel 110. During this initial movement the friction surfaces 108 of the first locking element 104 begin to descend toward the support surface 170. In other words, the first locking element legs 160 move downward through the passageways 158 in the cross braces 152. As the adjustment member 82 continues to rotate toward the locked position, eventually the friction surfaces 108 of the first locking element 156 contact the support surface 170. At this point the first knee 88 of the adjustment member 82 is still captured between the center lip 140 of the first locking element 104 and the first locking channel 110. Once the friction surfaces 108 of the first locking element 104 contact the support surface 170, the first locking element 104, and of course the center lip 140 of the first locking element 104, remain fixed in place. The first knee 88 of the adjustment member 82, however, has not yet reached the bottom of the arc of rotation 100. As the adjustment member 82, and the first knee 88 of the adjustment member 82, continue to rotate the first knee 88 of the adjustment member 82 continues to exert downward pressure on the first locking channel 110. At this point a gap begins to develop between the locking channel 110 and the offset lips 166 of the first locking element 104 (FIGS. 6–7). Accordingly, since the locking assembly springs 138 are captured between the offset lips 166 and the spring back plate 134, the locking assembly springs 138 begin to compress. In other words, because the locking assembly pins 136 are secured to the first locking channel 110 through the locking channel passageways 146, as the first knee 88 of the adjustment member 82 continues to force the first locking channel 110 downward the spring back plate 134 is also forced downward. The offset lips 166 of the first locking element 104 hold the locking assembly springs 138 in place. Thus, the action of the first knee 88 of the adjustment member 82 which forces the first locking channel 110, the locking assembly pins 136, and the spring back plate 134 to descend also forces the locking assembly springs 138 to compress. Finally, the first knee 88 of the adjustment member 82 reaches the bottom of the arc of rotation 100. At this point the flattened outer engagement surface 92 engages with the first locking channel 110 and the first locking assembly 156 has reached the locked position shown in FIG. 6 and FIG. 7. Thus, the gap between the first locking channel 110 and the first locking element 104 created by the first knee 88 of the adjustment member 82 and maintained by the pressure of the locking assembly springs 138, creates a tension which urges the friction surfaces 108 of the first locking element 104 into contact with the support surface 170, thereby preventing rolling engagement of the wheels 80 with the support surface 170.

The foregoing description and drawings merely explain and illustrate preferred embodiments of the invention and the invention is not limited thereto, except insofar as the claims are so limited. Those skilled in the art, who have the disclosure before them, will be able to make modifications and variations therein without departing from the scope of the invention. For example, it is anticipated that the wheeled cart of the present invention could comprise only one locking assembly and only one cargo ramp assembly.

What is claimed is:

1. A locking assembly for a wheeled cart for transportation and storage of cargo, the wheeled cart having a frame with a plurality of wheels mounted to the frame for rolling engagement with a support surface, said locking assembly being in engagement with said frame, said locking assembly being adjustable between an unlocked position to allow rolling movement of the wheeled cart upon the support surface and a locked position for preventing rolling movement of the wheeled cart upon the support surface to allow for easier loading and unloading of cargo and to keep the wheeled cart stationary during storage, said locking assembly comprises:

i) a locking assembly in engagement with said frame for adjustable engagement between a locked position for preventing rolling movement and an unlocked position to allow rolling movement upon the support surface, said locking assembly comprises: an adjustment member in engagement with said frame, said adjustment member being selectively adjustable between said locked position and said unlocked position, said adjustment member having a shaft with a knee formed by a bent section of said adjustment member; and ii) a locking element integrated with said frame and activated by said adjustment member, said locking element having a friction surface placed in engagement with the support surface by adjusting said adjustment member to said locked position, said friction surface being held at a distance from the support surface by adjusting said adjustment member to said unlocked position to permit rolling of said wheels on the support surface, wherein a flattened outer engagement surface of said adjustment member is substantially tangent to an outer perimeter of an arc of rotation of said knee and said outer engagement surface is at a top of said arc of rotation when said adjustment member is in said unlocked position and said outer engagement surface is at a bottom of said arc of rotation when said adjustment member is in said locked position.

2. The invention in accordance with claim 1 wherein said shaft of said adjustment member is in rotatable engagement with said frame, and wherein said locking element is in rotatable engagement with said knee of said adjustment member thereby moving said friction surfaces of said locking element in and out of engagement with the support surface as said adjustment member rotates between said locked position and said unlocked position.

3. The invention in accordance with claim 1 further comprising a locking channel in slideable engagement with said locking element, and a locking assembly spring means having a first section in engagement with said locking channel and a second section in engagement with said locking element, wherein said knee of said adjustment member can be captured between said locking channel and said locking element such that said outer engagement surface of said knee of said adjustable member is in engagement with said locking channel when said adjustment member is in said locked position and said outer engagement surface of said knee of said adjustment member is in engagement with said locking element when said adjustment member is in said unlocked position, and wherein said locking assembly spring means urges said friction surface of said locking element into engagement with the support surface when said adjustment member is in said locked position.

4. The invention in accordance with claim 3 wherein said knee of said adjustment member has a flattened inner engagement surface such that as said adjustment member rotates said inner engagement surface is substantially tangent to an interior arc of rotation of said knee of said adjustment member, and said inner engagement surface of said knee of said adjustment member is in engagement with said locking channel when said adjustment member is in said unlocked position.

5. The invention in accordance with claim 1 wherein said shaft is in rotatable engagement with said frame and said shaft has a first end, a second end, said knee being a first knee formed by said bent section near said first end of said adjustment member, a second knee formed by a bent section of said second end of said adjustment member; and further comprising a first locking element, and a second locking element, wherein said first locking element is in rotatable engagement with said first knee of said adjustment member and wherein said second locking element is in rotatable engagement with said second knee of said adjustment member, and said adjustment member is rotatable between said locked position and said unlocked position to adjust said friction surfaces of said first and said second locking element in and out of engagement with the support surface.

6. The invention in accordance with claim 5 wherein said flattened outer engagement surface is a first flattened outer engagement surface on said first knee and a second flattened outer engagement surface on said second knee of said adjustment member such that as said adjustment member rotates said outer engagement surfaces are substantially tangent to the outer perimeter of the arc of rotation of said first knee and said second knee of said adjustment member, and said outer engagement surfaces of said first and said second knees of said adjustment member are at the top of said arc of rotation when said adjustment member is in said unlocked position and said outer engagement surfaces of said first and said second knees of said adjustment member are at the bottom of said arc of rotation when said adjustment member is in said locked position.

7. The invention in accordance with claim 6 further comprising:

a) a first locking channel in slideable engagement with said first locking element, and a first locking assembly spring means having a first section in engagement with said first locking channel and a second section in engagement with said first locking element, wherein said first knee of said adjustment member can be captured between said first locking channel and said first locking element such that said first outer engagement surface of said first knee of said adjustable member is in engagement with said first locking channel when said adjustment member is in said locked position and said first outer engagement surface of said first knee of said adjustment member is in engagement with said first locking element when said adjustment member is in said unlocked position, and wherein said first locking assembly spring means compresses when said adjustment member is in said locked position to urge said friction surface of said first locking element into engagement with the support surface; and b) a second locking channel in slideable engagement with said second locking element, and a second locking assembly spring means having a first section in engagement with said second locking channel and a second section in engagement with said second locking element, wherein said second knee of said adjustment member can be captured between said second locking channel and said second locking element such that said second outer engagement surface of said second knee of said adjustable member is in engagement with said second locking channel when said adjustment member is in said locked position and said second outer engagement surface of said second knee of said adjustment member is in engagement with said second locking element when said adjustment member is in said unlocked position, and wherein said second locking assembly spring means compresses when said adjustment member is in said locked position to urge said friction surface of said second locking element into engagement with the support surface.

8. The invention in accordance with claim 7 wherein said first knee and said second knee of said adjustment member have a flattened inner engagement surface such that as said adjustment member rotates said inner engagement surface is substantially tangent to an interior arc of rotation of said first knee and said second knee of said adjustment member, and said inner engagement surface of said first knee of said adjustment member is in engagement with said first locking channel when said adjustment member is in said unlocked position, and said inner engagement surface of said second knee of said adjustment member is in engagement with said second locking channel when said adjustment member is in said unlocked position.

9. A locking assembly for a wheeled cart for transportation and storage of cargo said locking assembly of said wheeled cart adjustable so that rolling movement may be prevented to allow for easier loading and unloading of cargo and to keep the wheeled cart stationary during storage, said locking assembly comprises:

a) a frame;

b) a plurality of wheels mounted to said frame, said wheels being capable of rolling engagement with the support surface;

c) an adjustment member in engagement with said frame, said adjustment member being selectively adjustable between a locked position and an unlocked position, said adjustment member comprising a shaft in rotatable engagement with said frame having a first end, a second end, a first knee being formed by a bent section of said first end of said adjustment member, and a second knee being formed by a bent section of said second end of said adjustment member, and wherein said first knee and said second knee of said adjustment member have a flattened outer engagement surface such that as said adjustment member rotates said outer engagement surface is substantially tangent to an outer perimeter of the arc of rotation of said first knee and said second knee of said adjustment member, and said outer engagement surfaces of said first and said second knee of said adjustment member are at a top of said arc of rotation when said adjustment member is in said unlocked position and said outer engagement surface of said first and said second knee of said adjustment member is at a bottom of said arc of rotation when said adjustment member is in said locked position, and wherein said first knee and said second knee of said adjustment member each have a flattened inner engagement surface such that as said adjustment member rotates said inner engagement surfaces are substantially tangent to an interior arc of rotation of said first knee and said second knee of said adjustment member;

d) a first locking element, and a second locking element, wherein said first locking element is in rotatable engagement with said first knee of said adjustment member and wherein said second locking element is in rotatable engagement with said second knee of said adjustment member, and said adjustment member is rotatable between said locked position and said unlocked position to adjust said friction surfaces of said first and said second locking elements in and out of engagement with the support surface.

e) a first locking channel in slideable engagement with said first locking element, and a first locking assembly spring means having a first section in engagement with said first locking channel and a second section in engagement with said first locking element, wherein said first knee of said adjustment member can be captured between said first locking channel and said first locking element such that said outer engagement surface of said first knee of said adjustable member is in engagement with said first locking channel when said adjustment member is in said locked position and said outer engagement surface of said first knee of said adjustment member is in engagement with said first locking element when said adjustment member is in said unlocked position, and wherein said first locking assembly spring means urges said friction surfaces of said first locking element into engagement with the support surface when said adjustment member is in said locked position, and wherein said inner engagement surface of said first knee of said adjustment member is in engagement with said first locking channel when said adjustment member is in said unlocked position; and f) a second locking channel in slideable engagement with said second locking element, and a second locking assembly spring means having a first section in engagement with said second locking channel and a second section in engagement with said second locking element, wherein said second knee of said adjustment member can be captured between said second locking channel and said second locking element such that said outer engagement surface of said second knee of said adjustable member is in engagement with said second locking channel when said adjustment member is in said locked position and said outer engagement surface of said second knee of said adjustment member is in engagement with said second locking element when said adjustment member is in said unlocked position, and wherein said second locking assembly spring means compresses when said adjustment member is in said locked position to urge said friction surfaces of said second locking element into engagement with the support surface, and wherein said inner engagement surface of said second knee of said adjustment member is in engagement with said second locking channel when said adjustment member is in said unlocked position.

10. A locking assembly for a cart having a frame mounted to a plurality of wheels for engagement with a support surface, comprising:

(a) an adjustment member in engagement with the frame; and (b) a locking element integrated with the frame and activated by the adjustment member, the locking element having a friction surface placed in engagement with the support surface by adjusting the adjustment member to a locked position, the friction surface being held at a distance from the support surface by adjusting the adjustment member to an unlocked position to permit rolling of the wheels on the support surface, wherein an engagement section of the adjustment member contacts the locking element and moves through a substantially semi-circular arc of rotation as the adjustment member moves from the unlocked position to the locked position, and wherein a flattened outer engagement surface of the adjustment member remains substantially tangent to an outer perimeter of the substantially semi-circular arc of rotation as the adjustment member moves from the unlocked position to the locked position.

11. The locking assembly of claim 10 wherein the adjustment member comprises a shaft with a knee formed by a bent section of the shaft, and wherein the engagement section is on the knee of the shaft.

* * * * *